United States Patent
Martinelli (10) Patent No.: US 9,531,190 B2
(45) Date of Patent: Dec. 27, 2016

(54) BI-DIRECTIONAL CONVERTER VOLTAGE CONTROLLED CURRENT SOURCE FOR VOLTAGE REGULATION

(75) Inventor: Robert Matthew Martinelli, Murrieta, CA (US)

(73) Assignee: The Boeing Company, Chicago, IL (US)

( * ) Notice: Subject to any disclaimer, the term of this patent is extended or adjusted under 35 U.S.C. 154(b) by 1054 days.

(21) Appl. No.: 13/402,887

(22) Filed: Feb. 23, 2012

(65) Prior Publication Data

US 2012/0262133 A1    Oct. 18, 2012

Related U.S. Application Data

(60) Provisional application No. 61/476,242, filed on Apr. 15, 2011.

(51) Int. Cl.
*G06F 1/00* (2006.01)
*H02J 1/06* (2006.01)
*H02M 3/158* (2006.01)

(52) U.S. Cl.
CPC ............... *H02J 1/06* (2013.01); *H02M 3/1582* (2013.01)

(58) Field of Classification Search
CPC ................................ H02J 1/06; H02M 3/1582
USPC ............... 323/222, 223, 282, 284, 285, 351, 299,323/906
See application file for complete search history.

(56) References Cited

U.S. PATENT DOCUMENTS

| | | |
|---|---|---|
| 4,835,652 A | 5/1989 | Billings et al. |
| 5,359,280 A | 10/1994 | Canter et al. |
| 5,477,132 A | 12/1995 | Canter et al. |
| 6,452,815 B1 | 9/2002 | Zhu et al. |
| 6,574,125 B2 | 6/2003 | Matsukawa et al. |
| 7,183,756 B1 | 2/2007 | Dikken et al. |
| 7,348,767 B2 * | 3/2008 | Hack et al. .................. 323/316 |
| 7,548,029 B2 | 6/2009 | Cheng et al. |
| 7,923,858 B2 | 4/2011 | Ito et al. |
| 8,004,237 B2 | 8/2011 | Manor et al. |

(Continued)

FOREIGN PATENT DOCUMENTS

| | | |
|---|---|---|
| CN | 1039665 A | 2/1990 |
| CN | 1748150 A | 3/2006 |

(Continued)

OTHER PUBLICATIONS

Mohammadhassan Abdollahi Sofia and Lingfeng Wang, "Control of DC-DC Bidirectional Converters for Interfacing Batteries in Microgrids", Power Systems Conference and Exposition (PSCE), 2011 IEEE/PES; Mar. 20-23, 2011; pp. 1-6.

(Continued)

*Primary Examiner* — Adolf Berhane
*Assistant Examiner* — Afework Demisse
(74) *Attorney, Agent, or Firm* — McDonnell Boehnen Hulbert & Berghoff LLP (57) ABSTRACT

A bi-directional converter voltage controlled current system and methods are disclosed. A bi-directional converter provides a bi-directional current to an electrical bus according to a variable duty-cycle control signal. Also, a bi-directional current sensing sensor senses the bi-directional current to provide a sensor voltage signal proportional to the converter current. Further, a variable duty-cycle controller controls a duty-cycle of the variable duty-cycle control signal to control a voltage of the electrical bus based on an error signal.

20 Claims, 6 Drawing Sheets

(56) References Cited

U.S. PATENT DOCUMENTS

| | | | |
|---|---|---|---|
| 8,570,769 B2* | 10/2013 | Moussaoui | H02M 3/33584 363/15 |
| 2002/0136060 A1 | 9/2002 | Taniguchi | |
| 2009/0261796 A1 | 10/2009 | Ito et al. | |
| 2011/0101937 A1* | 5/2011 | Dobkin | H02M 3/156 323/282 |
| 2012/0074949 A1* | 3/2012 | Kepley | H02M 3/33584 324/426 |

FOREIGN PATENT DOCUMENTS

| | | |
|---|---|---|
| CN | 101171718 A | 4/2008 |
| CN | 201117093 Y | 9/2008 |
| CN | 1901345 A | 1/2009 |
| CN | 101432631 A | 5/2009 |
| CN | 101710741 A | 5/2010 |
| JP | H07-023505 | 1/1995 |
| JP | 2008228420 | 9/2008 |

OTHER PUBLICATIONS

Zhang, Junhong, "Bidirectional DC-DC Power Converter Design Optimization, Modeling and Control", Doctoral Dissertation, Virginia Polytechnic Institute and State University, Jan. 30, 2008.

English Translation of First Office Action issued in Chinese Patent Application No. 201210111700.9 dated Aug. 5, 2015.

English Translation of Search Report issued in Chinese Patent Application No. 201210111700.9.

Office Action Issued in Canadian Patent Application No. 2773804 dated Jun. 2, 2015.

English-language translation of Notice of Reasons for Rejection, Japanese Patent Application No. 2012-090328, issued Feb. 16, 2016.

* cited by examiner

BI-DIRECTIONAL CONVERTER VOLTAGE CONTROLLED CURRENT SOURCE FOR VOLTAGE REGULATION

CROSS-REFERENCE TO RELATED APPLICATION

This application claims the benefit of U.S. Provisional Application Ser. No. 61/476,242, filed on Apr. 15, 2011, the content of which is incorporated by reference herein in its entirety.

FIELD

Embodiments of the present disclosure relate generally to voltage converter systems. More particularly, embodiments of the present disclosure relate to control of voltage converter systems.

BACKGROUND

A voltage converter is generally an electronic circuit in a class of power converters, which converts a source of current from one voltage level to another. Voltage converters are important in various applications, where power is supplied from a power source such as, for example but without limitation, satellites, spacecraft, automobiles, portable electronic devices such as cellular phones and laptop computers, or other power source. Such applications often contain several sub-circuits, each with its own voltage level different from that supplied by the power source. The voltage level may be higher or lower than the voltage from the power source.

A step-up/boost converter is a voltage converter with an output voltage greater than its input voltage. A step-down/buck converter is a voltage converter with an output voltage lower than its input voltage. A bi-directional voltage converter may transfer current from a first electrical bus at a first voltage (e.g., an electrical bus coupled to a battery) to a second electrical bus at a second voltage (e.g., a load) and vice versa from the second electrical bus at the second voltage to the first electrical bus at the first voltage.

Bus stabilization methods used in electrical circuit designs may comprise a system with basic units that are each individually stabilized with staggered set-points. The staggered set-points may transition from mode to mode as a central amplifier varies across a full operating range. Gaps between operating modes may result in bus transients that can create, for example, a large low frequency ripple on a bus when subjected to continuous load transients. The bus impedance may be very high as a control transitions from mode to mode of the central amplifier. Also in some cases, there is a limited amplitude oscillation that persists on the bus until a capability of a current source increases or a load changes. Filters made of capacitors and or inductors are generally added to an input and/or an output of a voltage converter to reduce a voltage ripple caused by, for example, transients, oscillations, or other cause.

SUMMARY

A bi-directional converter voltage controlled current system and methods are disclosed. A bi-directional converter provides a bi-directional current to an electrical bus according to a variable duty-cycle control signal. Also, a bi-directional current sensor senses the bi-directional current to provide a sensor voltage signal proportional to the converter current. Further, a variable duty-cycle controller controls a duty-cycle of the variable duty-cycle control signal to control a voltage of the electrical bus based on an error signal.

In this manner, embodiments of the disclosure provide a bi-directional converter voltage controlled current source for stabilizing a control loop of the bi-directional converter. A transfer function of the bi-directional converter voltage controlled current system is simplified to be substantially equivalent to a voltage controlled current source. Simplifying the transfer function radically simplifies a control system when the bi-directional converter is used in a control system (e.g., a spacecraft) where power flows in and out of various sources coupled to an electrical bus.

Advantages for this system comprise, for example but without limitation: current sharing of like modules; easy transition from a first type of regulator system (e.g., a solar panel regulator system) to a second type of regulator system (e.g., a battery charge/discharge control system); simplified control loop stabilization since all converters provide a voltage controlled current to a capacitance of the electrical bus (e.g., a spacecraft load) and other advantages. The bi-directional converter voltage controlled current source system creates a highly versatile building block for power systems.

In an embodiment, a bi-directional converter voltage controlled current system comprises a bi-directional converter, a bi-directional current sensor, and a variable duty-cycle controller. The bi-directional converter provides a bi-directional current to an electrical bus according to a variable duty-cycle control signal. The bi-directional current sensor senses the bi-directional current to provide a sensor voltage signal proportional to the bi-directional current. The variable duty-cycle controller controls a duty-cycle of the variable duty-cycle control signal to control a voltage of the electrical bus based on an error signal.

In another embodiment, a voltage control method for a bi-directional converter voltage controlled current system controls a bi-directional converter using a variable duty-cycle control signal. The method further senses a converter current in the bi-directional converter using a bi-directional current sensor to provide a sensor voltage signal proportional to the converter current. The method further controls a duty-cycle of the variable duty-cycle control signal based on a voltage error signal.

In a further embodiment, a method for providing a bi-directional converter voltage controlled current source provides a bi-directional converter operable to provide a converter current to an electrical bus according to a variable duty-cycle control signal. The method further provides a bi-directional current sensor operable to sense the converter current to provide a sensor voltage signal proportional to the converter current. The method further provides a variable duty-cycle controller operable to control a duty-cycle of the variable duty-cycle control signal to control a voltage of the electrical bus based on an error signal.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunc

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to electrical control systems, analog and digital circuit design, and other functional aspects of the systems (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, voltage regulation on a manned and unmanned spacecraft or satellite electrical bus. Embodiments of the disclosure, however, are not limited to such spacecraft or satellite applications, and the techniques described herein may also be utilized in other applications. For example but without limitation, embodiments may be applicable to an electrical bus of manned and unmanned aircraft, ships, automobiles, buildings, trains, submarines, various voltage conversion applications and circuits, or other electrical bus.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Embodiments of the disclosure provide a bi-directional converter voltage controlled current source system for stabilizing a control loop of the bi-directional converter. A transfer function of the bi-directional converter voltage controlled current source system is simplified to be substantially equivalent to a voltage controlled current source. Simplifying the transfer function radically simplifies a control system when the bi-directional converter is used in a control system (e.g., a spacecraft) where power flows in and out of various sources coupled to an electrical bus. Advantages for this system comprise, for example but without limitation: current sharing of like modules; easy transition from a first type of regulator system (e.g., a solar panel regulator system) to a second type of regulator system (e.g., a battery charge/discharge control system); simplified control loop stabilization since all converters provide a voltage controlled current to a capacitance of the electrical bus (e.g., a spacecraft load). The bi-directional converter voltage controlled current source system creates a highly versatile building block for power systems.

Figure 1:
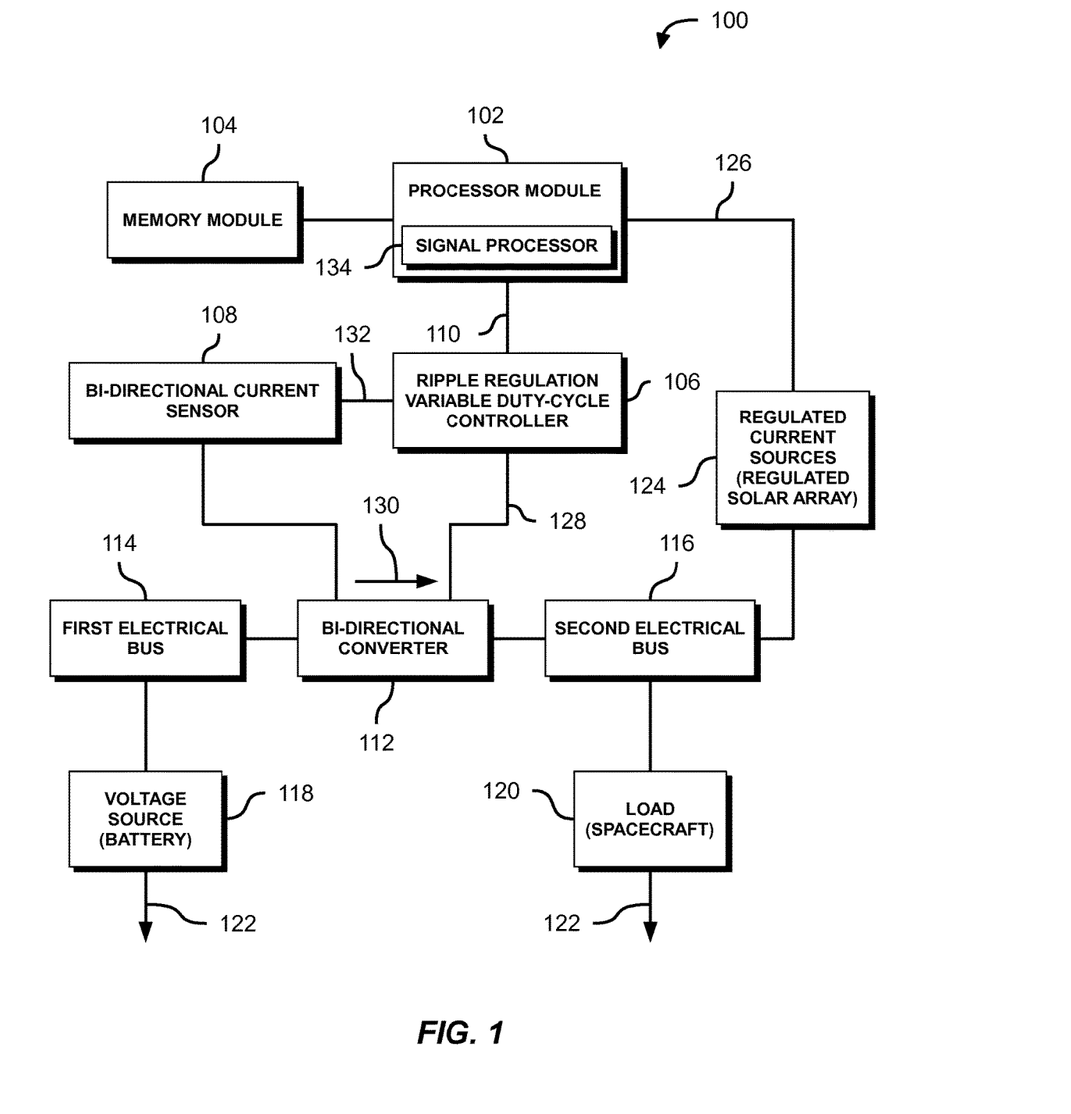
- FIG. 1 is an illustration of an exemplary functional block diagram of a bi-directional converter voltage controlled current source system according to an embodiment of the disclosure.

FIG. 1 is an illustration of an exemplary functional block diagram of a bi-directional converter voltage controlled current source system (system 100) according to an embodiment of the disclosure. The system 100 generally comprises a processor module 102, a memory module 104, a ripple regulation variable duty-cycle controller 106 (ripple regulation controller 106), a bi-directional current sensor 108, a bi-directional converter 112, a first electrical bus 114, a second electrical bus 116, a voltage source 118 (e.g., a battery), a load 120, and a common ground 122 (ground 122). The system 100 may also comprise other regulated current sources 124 such as a regulated solar array.

The bi-directional converter 112 is coupled to the first electrical bus 114 and the second electrical bus 116, and is configured to provide a bi-directional current from/to the first electrical bus 114, and to/from the second electrical bus 116. For example but without limitation, the bi-directional converter 112 may be configured to provide a bi-directional current 130 from/to the first electrical bus 114 coupled to the voltage source 118 comprising a battery to/from the second electrical bus 116 coupled to the load 120 comprising a spacecraft, or other load.

The bi-directional current sensor 108 is coupled to the bi-directional converter 112, and is operable to sense the bi-directional current 130. For example but without limitation, a rectifier current may be measured through a synchronous rectifier of the bi-directional converter 112 via a transformer to provide a current sensor voltage 132 proportional to the bi-directional current 130.

The ripple regulation controller 106 is coupled to the bi-directional current sensor 108 and the bi-directional converter 112. The ripple regulation controller 106 controls the bi-directional current 130 of the bi-directional converter 112 to be proportional to a control signal 110 from a signal processor 134 of the processor module 102. As the bi-directional current 130 is proportional to the control signal 110, an overall control loop of the bi-direction current controlled current source 106 is simplified to a first order system. Thereby, the bi-directional converter 112 is controlled to function as a voltage controlled current source, and may be operated in a system comprising other regulated current sources such as the regulated current sources 124. A regulated solar array 124 is an example of the regulated current sources 124, and as such the regulated solar array 124 and the regulated current sources 124 may be used interchangeably in this document.

The ripple regulation controller 106 produces a variable duty-cycle control signal 128 (control signal 128) such as a pulse-width modulated (PWM) signal that forces (via control of the bi-directional converter 112) a current sensor voltage 132 output from the bi-directional current sensor 108 to be equal to the control signal 110. The ripple regulation controller 106 adjusts on and off voltage thresholds of the control signal 128 such that an average output voltage of the bi-directional current sensor 108 is equal to the control signal 110, thereby controlling a bi-directional current through the bi-directional converter 112.

For example but without limitation, for a bi-directional converter such as the bi-directional converter 112, a bus current delivered to the second electrical bus 116 from the first electrical bus 114 may be controlled using a synchronous switch according to a control signal such as the control signal 110 comprising a PWM duty cycle set by the ripple regulation controller 106.

A switching frequency of the PWM duty cycle may vary as a function of a voltage on the second electrical bus 116 (e.g., as the load 120 changes). A feedback loop of the ripple regulation controller 106 adjusts a feedback loop hysteresis of the ripple regulation controller 106 to reduce a frequency of the switching frequency of the PWM duty cycle so that the bi-directional converter 112 can achieve very high or very low duty cycle control (e.g., as the voltage of first electrical bus 114 approaches the voltage of the second electrical bus 116). The feedback loop hysteresis of the ripple regulation controller 106 may be limited to a maximum and a minimum.

The ripple regulation controller 106 may employ variable frequency stabilization to achieve either a very high duty cycle or a very low duty cycle operation. A very high duty cycle may be required when a voltage of the first electrical bus 114 is nearly equal to the second electrical bus 116 voltage. A very low duty cycle may be required when the first electrical bus 114 voltage is much lower than the second electrical bus 116 voltage. The ripple regulation controller 106 also controls a switching frequency of the control signal 128 to allow operation of a bi-directional converter such as the bi-directional converter 112 at substantially extreme duty cycles. In this manner, performance of the system 100 is optimized. The substantially extreme duty cycle may comprise, for example but without limitation, a duty cycle near either 0 or 1, where 0 is a 0% duty cycle and 1 is a 100% duty cycle, or other duty cycle. An error signal of the feedback loop of the ripple regulation controller 106 may be set to vary from a fixed negative value to a fixed positive value, thus limiting a range of current that can flow from the first electrical bus 114 to the second electrical bus 116.

Figure 4:
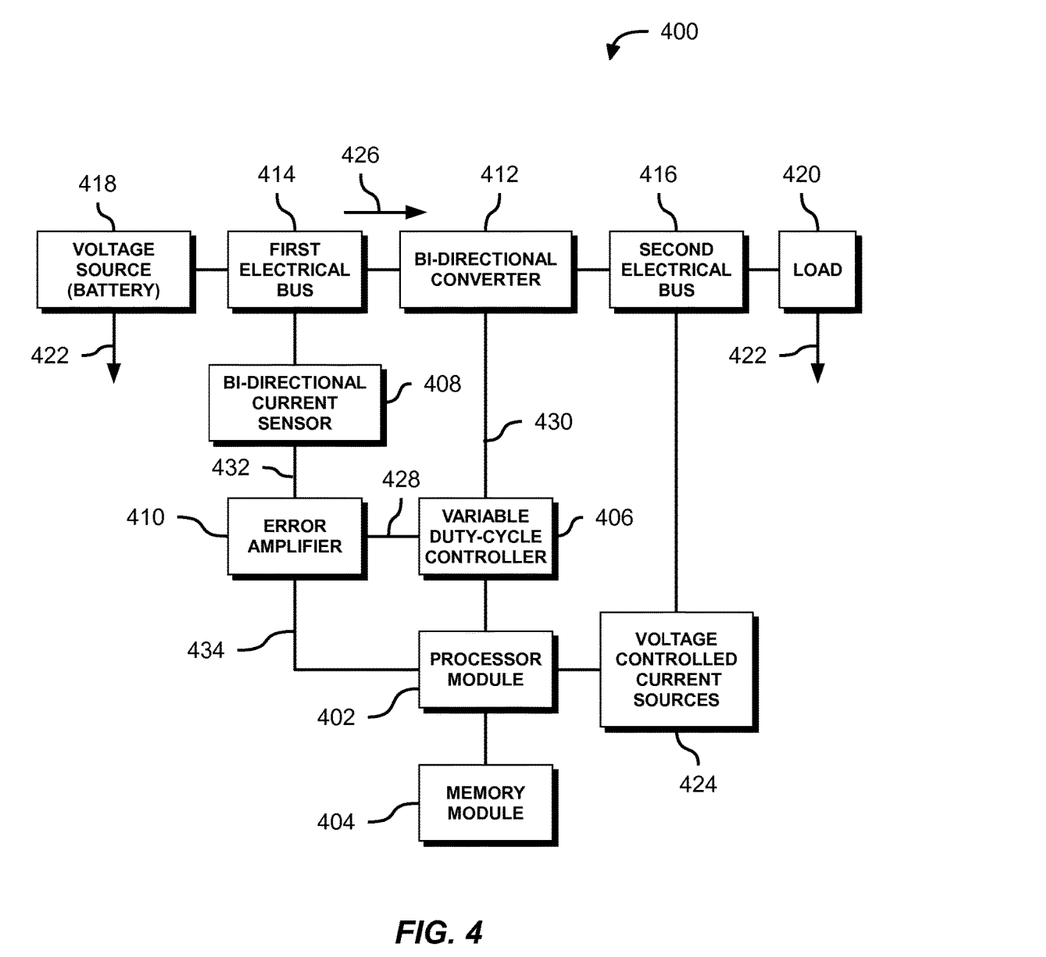
FIG. 4 is an illustration of an exemplary functional block diagram of a bi-directional converter voltage controlled current source system according to an embodiment of the disclosure.

The processor module 102 may collect data from elements of a power system such as the regulated current sources 124 via, for example, a communication line 126 and produce the control signal 110. The control signal 110 may be controlled to be proportional to a voltage error signal based on a comparison of a voltage of the first electrical bus 114 or the second electrical bus 116 to a voltage control signal 434 (FIG. 4). The processor module 102 comprises processing logic that is configured to carry out the functions, techniques, and processing tasks associated with operation of the system 100.

In particular, the processing logic is configured to support the system 100 described herein. For example, the processor module 102 may monitor: a voltage of the second electrical bus 116, an output current of the regulated solar array 124, and/or a battery voltage of the voltage source 118, to control a charging current of the voltage source 118 or a voltage of the second electrical bus 116 such as a spacecraft bus voltage. For another example, the processor module 102 may comprise the signal processor 134 to send a control signal 110 to the ripple regulation controller 106.

The processor module 102 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 104 may be a data storage area with memory formatted to support the operation of the system 100. The memory module 104 is configured to store, maintain, and provide data as needed to support the functionality of the system 100 in the manner described herein. For example, the memory module 104 may store a frequency of the ripple regulation controller 106 that varies as a function of a voltage of the load 120. Memory module 104 may also store a voltage, a reference voltage, a PWM duty cycle, or other data.

In practical embodiments, the memory module 104 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 104 may be coupled to the processor module 102 and configured to store, for example but without limitation, a computer program that is executed by the processor module 102, an operating system, an application program, tentative data used in executing a program, or other application. Additionally, the memory module 104 may represent a dynamically updating database containing a table for updating the data mentioned above.

The memory module 104 may be coupled to the processor module 102 such that the processor module 102 can read information from and write information to the memory module 104. For example the processor module 102 may access the memory module 104 to monitor the switching frequency of the PWM duty cycle of the control signal of the ripple regulation controller 106. In this manner, the processor module 102 can control a feedback loop of the ripple regulation controller 106. As an example, the processor module 102 and memory module 104 may reside in respective application specific integrated circuits (ASICs). The memory module 104 may also be integrated into the processor module 102. In an embodiment, the memory module 104 may comprise a cache memory for storing temporary variables or other intermediate information during execution of instructions to be executed by the processor module 102.

The voltage source 118 may comprise, for example but without limitation, a fuel cell, a battery, a generator, a satellite power source, a spacecraft power source, an aircraft power source, a shipboard generator, a train power source, a solar and engine powered long-duration aircraft, or spacecraft (manned and unmanned) power source, a super-heated thermal couple from a reactor, or other voltage source capable of sourcing or sinking current.

The load 120 may comprise, for example but without limitation, an electronic device, a motor, a battery, a heater, a power distribution system, an appliance, an additional electrical bus, or other load.

The regulated current sources 124 may comprise, for example but without limitation, a regulated solar array, a reaction wheel, a 30V load, or other current source capable of sourcing or sinking current.

Figure 2:
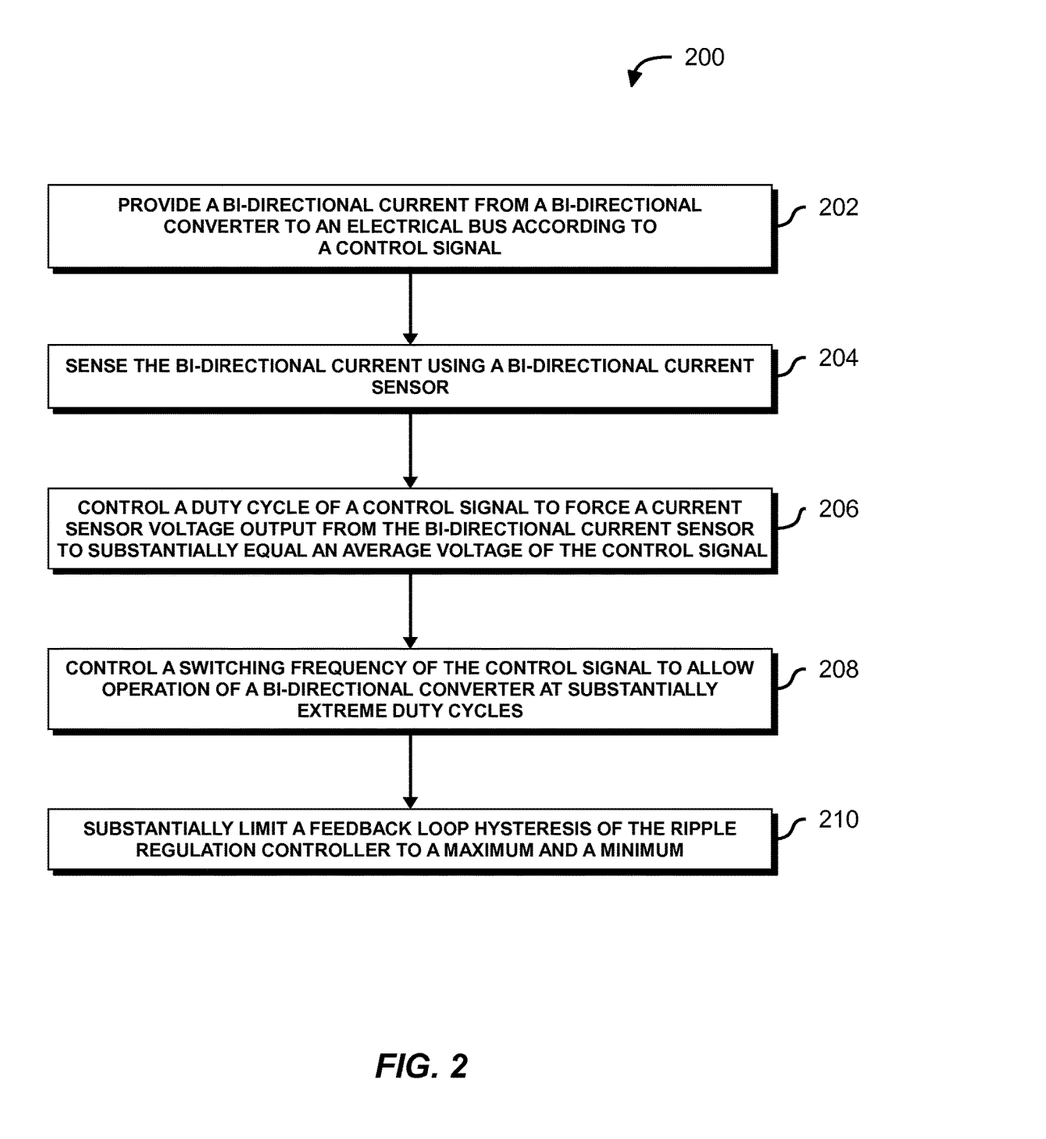
FIG. 2 is an illustration of an exemplary flowchart showing a ripple regulation process according to an embodiment of the disclosure.

FIG. 2 is an illustration of an exemplary flowchart showing a ripple regulation process 200 according to an embodiment of the disclosure. The various tasks performed in connection with process 200 may be performed mechanically, by software, hardware, firmware, or any combination thereof. It should be appreciated that process 200 may include any number of additional or alternative tasks, the tasks shown in FIG. 2 need not be performed in the illustrated order, and the process 200 may be incorporated into a more comprehensive procedure or process having additional functionality not described in detail herein.

For illustrative purposes, the following description of process 200 may refer to elements mentioned above in connection with FIG. 1. In practical embodiments, portions of the process 200 may be performed by different elements of the system 100 such as: the processor module 102, the memory module 104, the ripple regulation controller 106, the bi-directional current sensor 108, the first electrical bus 114, the second electrical bus 116, the voltage source 118, the load 120, the common ground 122, etc. The process 200 may have functions, material, and structures that are similar to the embodiments shown in FIG. 1. Therefore common features, functions, and elements may not be redundantly described here.

Process 200 may begin by providing a bi-directional current from the bi-directional converter 112 to an electrical bus such as the first electrical bus 114 or the second electrical bus 116 according to a control signal (task 202). The control signal may comprise, for example but without limitation, a variable duty-cycle control signal, a pulse-width modulation control signal, or other control signal.

Process 200 may continue by sensing the bi-directional current using a bi-directional current sensor such as the bi-directional current sensor 108 (task 204).

Process 200 may continue by a ripple regulation controller such as the ripple regulation controller 106 controlling a duty cycle of a control signal such as the control signal 128 to force a current sensor voltage such as the current sensor voltage 132 output from the bi-directional current sensor 108 to substantially equal an average voltage of the control signal 110 (task 206).

Process 200 may continue by the ripple regulation controller 106 controlling a switching frequency of the control signal 128 to allow operation of a bi-directional converter such as the bi-directional converter 112 at substantially extreme duty cycles (task 208). As explained above, the substantially extreme duty cycle may comprise, for example but without limitation, a duty cycle near either 0 or 1, where 0 is a 0% duty cycle and 1 is a 100% duty cycle, or other duty cycle.

Process 200 may continue by substantially limiting a feedback loop hysteresis of the ripple regulation controller 106 to a maximum and a minimum (task 210).

Figure 3:
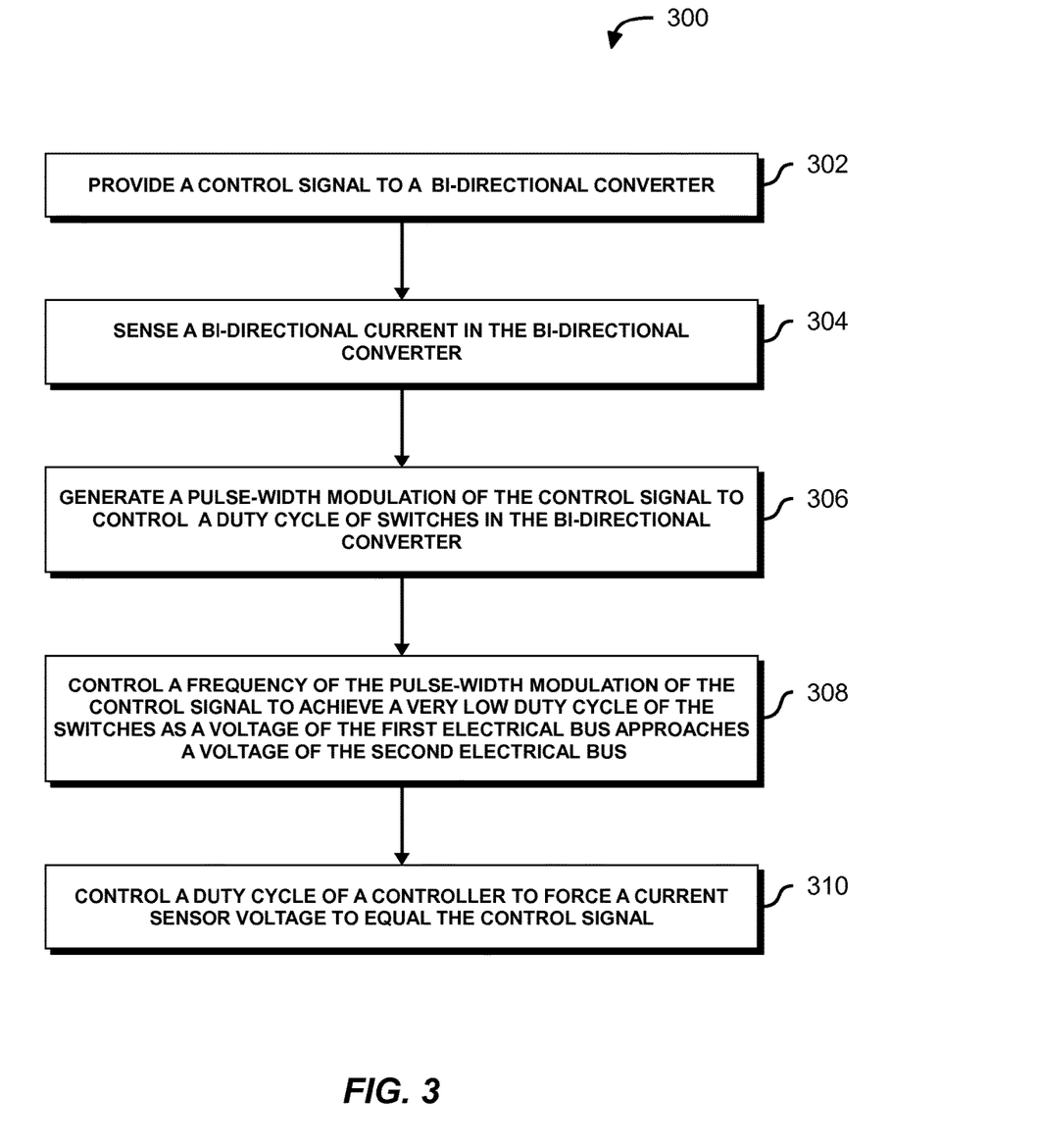
FIG. 3 is an illustration of an exemplary flowchart showing a voltage control process according to an embodiment of the disclosure.

FIG. 3 is an illustration of an exemplary flowchart showing a voltage control process 300 according to an embodiment of the disclosure. The various tasks performed in connection with process 300 may be performed mechanically, by software, hardware, firmware, or any combination thereof. It should be appreciated that process 300 may include any number of additional or alternative tasks, the tasks shown in FIG. 3 need not be performed in the illustrated order, and the process 300 may be incorporated into a more comprehensive procedure or process having additional functionality not described in detail herein.

For illustrative purposes, the following description of process 300 may refer to elements mentioned above in connection with FIG. 1. In practical embodiments, portions of the process 300 may be performed by different elements of the system 100 such as: the processor module 102, the memory module 104, the ripple regulation controller 106, the bi-directional current sensor 108, the first electrical bus 114, the second electrical bus 116, the voltage source 118, the load 120, the common ground 122, etc. The process 300 may have functions, material, and structures that are similar to the embodiments shown in FIG. 1. Therefore common features, functions, and elements may not be redundantly described here.

Process 300 may begin by providing a control signal such as the control signal 128 to a bi-directional converter such as the bi-directional converter 112 (task 302). The control signal may comprise, for example but without limitation, a variable duty-cycle control signal, a pulse-width modulation control signal, or other control signal.

Process 300 may continue by sensing a bi-directional current such as the bi-directional current 130 in the bi-directional converter 112 (task 304).

Process 300 may continue by generating a pulse-width modulation of the control signal 128 to control a duty cycle of switches in the bi-directional converter 112 (task 306).

Process 300 may continue by controlling a frequency of the pulse-width modulation of the control signal 128 to achieve a very low duty cycle of the switches as a voltage of the first electrical bus 114 approaches a voltage of the second electrical bus 116 (task 308).

Process 300 may continue by controlling a duty cycle of the ripple regulation controller 106 to force a current sensor voltage such as the current sensor voltage 132 to equal the control signal 128 (task 310).

FIG. 4 is an illustration of an exemplary functional block diagram of a bi-directional converter voltage controlled current source system (system 400) according to an embodiment of the disclosure. The system 400 generally comprises a processor module 402, a memory module 404, a variable duty-cycle controller 406, a bi-directional current sensor 408, an error amplifier 410, a bi-directional converter 412, a first electrical bus 414, a second electrical bus 416, a voltage source 418, a load 420, and a common ground 422 (ground 422). Furthermore, the system 400 may further comprise one or more voltage controlled current sources 424 coupled to the second electrical bus 416 and controlled by the processor module 402.

The system 400 may have functions, material, and structures that are similar to the system 100. Therefore common features, functions, and elements may not be redundantly described here. The system 400 is different from the system 100 shown FIG. 1 in that, the variable duty-cycle controller 406, the error amplifier 410, the voltage controlled current sources 424 are added to the system 400 and the ripple regulation controller 106 and the regulated solar array 124 of the system 100 may not necessarily be included in the system 400.

The bi-directional converter 412 is coupled to the first electrical bus 414 and the second electrical bus 416, and is configured to provide a bi-directional current 426 (converter current 426) from/to the first electrical bus 414, and to/from the second electrical bus 416. For example but without limitation, the bi-directional converter 412 may be configured to provide the bi-directional current 426 from/to the first electrical bus 414 coupled to the voltage source 418 comprising a battery or other voltage source, and to/from the second electrical bus 416 coupled to the load 420 comprising a spacecraft or other load. For another example but without limitation, the bi-directional converter 412 may be operable to switch a current from the voltage source 418 such as a solar panel coupled to the first electrical bus 414 to either the second electrical bus 416 or shunted to a ground 422.

The bi-directional converter 412 may also be configured to act as a buck type regulator for power flow in one direction (e.g., the bi-directional current 426) or a boost regulator for power flow in an opposite direction (e.g., negative of the bi-directional current 426) controlled by a duty cycle of a variable duty cycle variable duty-cycle control signal 430 from the variable duty-cycle controller 406. As the duty cycle is increased, a voltage is created that causes a current to increase in one direction of flow. When the duty cycle is decreased, a voltage is created that forces current to flow in the opposite direction.

The bi-directional current sensor 408 is coupled to the bi-directional converter 412, and is configured to sense the bi-directional current to provide a current sensor output. For example but without limitation, a rectifier current may be measured through a synchronous rectifier of the bi-directional converter 412 via a transformer to provide a sensed bi-directional current. The bi-directional current sensor 408 is operable to produce a voltage proportional to the current flowing in the bi-directional converter 412.

The variable duty-cycle controller 406 is coupled to the bi-directional current sensor 408 and the bi-directional converter 412. The variable duty-cycle controller 406 comprises a controller such as, for example but without limitation, a proportional-integral (PI) controller, a proportional-integral-derivative (PID) controller, a feedback controller, or other controller. The variable duty-cycle controller 406 generates a variable duty-cycle control signal (the variable duty-cycle control signal 430) such as, for example but without limitation, a PWM signal, a pulse density modulation signal, a pulse frequency modulation signal, or other variable duty-cycle signal. The variable duty-cycle controller 406 may comprise, for example but without limitation, analog circuitry, a combination of analog circuits, digital circuits, and/or software that generates the variable duty-cycle control signal 430. The variable duty-cycle controller 406 generates the variable duty-cycle control signal 430 in response to, for example but without limitation, a system level measurement, a system command, a control algorithm, or other system state.

The variable duty-cycle controller 406 produces a duty cycle that is proportional to an error signal 428 (voltage error signal 428). Increasing a duty cycle of the variable duty-cycle control signal 430 increases current flow from the first electrical bus 414 to the second electrical bus 416. Decreasing the duty cycle of the variable duty-cycle control signal 430 increases current flow from the second electrical bus 416 to the first electrical bus 414.

The variable duty-cycle controller 406 controls the bi-directional current of the bi-directional converter 412 to be proportional to the variable duty-cycle control signal 430 from the variable duty-cycle controller 406. For example but without limitation, for a bi-directional converter such as the bi-directional converter 412, a bus current delivered to the second electrical bus 416 from the first electrical bus 414 may be controlled using a synchronous switch according to variable duty-cycle control signal 430 comprising a PWM duty cycle set by the variable duty-cycle controller 406. The PWM duty cycle may be controlled to be proportional to an error signal 428 (voltage error signal 428) based on a comparison of a voltage of the second electrical bus 416 to the voltage control signal 434. A bi-directional current 426 delivered to the second electrical bus 416 is proportional to the error signal 428 (voltage error signal 428) generated by the error amplifier 410.

The variable duty-cycle controller 406 produces the variable duty-cycle control signal 430 such as a pulse-width modulated signal that is used to control a duty cycle of power switches in the bi-directional converter 412. A frequency of the variable duty-cycle controller 406 may be either fixed or variable depending on the modulation technique used. A significant function of the variable duty-cycle controller 406 is to produce a current such as the bi-directional current 426 in a voltage source such as the voltage source 418 that is proportional to the voltage control signal 434 and thus control an amount of current either removed or returned to the voltage source 418.

A switching frequency of the PWM duty cycle may vary as a function of a voltage on the second electrical bus 416 as the load 420 changes. A feedback loop of the variable duty-cycle controller 406 adjusts the switching frequency of the PWM control to achieve either a very low duty cycle when the two bus voltages are nearly identical or to achieve a very high duty cycle when the first electrical bus voltage is very low. The frequency adjustment is limited to substantially a maximum and a substantially minimum voltage value within a frequency control band.

The error amplifier 410 generates the voltage error signal 428 based on a comparison of a sensor voltage signal 432 sensed by bi-directional current sensor 408 to a voltage control signal 434.

For example, in a spacecraft bus regulator, for an error voltage in a region of about −10V to about 0V, a current delivered to a spacecraft bus from the (e.g., solar array) voltage controlled current sources 424 increases from 0 to a substantially maximum capability of a solar array coupled to the spacecraft bus. Between about 0V and about +10V, the current delivered to the spacecraft bus from the battery (as the voltage source 418) increases from about 0V to a current limit of a power supply such as the solar array coupled to the bi-directional converter 412.

If a gain of two parallel regulator systems comprising the bi-directional converter 412 and the voltage controlled current sources 424 are comparable, it would then be easy to design a single amplifier that could stabilize both systems and provide smooth bus control as the load current varies from no load to a substantially maximum load for any solar array capability as long as there is sufficient energy stored in the battery to provide power for a required time.

An error signal of the feedback loop may be set to vary from a fixed negative value to a fixed positive value, thus limiting maximum current that can flow between the first electrical bus 414 and the second electrical bus 416.

For example but without limitation, the system 400 may control a solar panel current delivered to the second electrical bus 416, or the bi-directional converter 412 may perform as a shunt regulator to control the second electrical bus 416 while charging the voltage source 418 (battery) with a substantially maximum available current, or the bi-directional converter 412 is functioning as a boost converter from the first electrical bus 414 to the second electrical bus 416, a transfer function of the system 400 is simplified to be substantially equivalent to a voltage controlled current source.

The processor module 402 comprises processing logic that is configured to carry out the functions, techniques, and processing tasks associated with the operation of the system 400. In particular, the processing logic is configured to support the system 400 described herein. For example, the processor module 402 may monitor a switching frequency of PWM duty cycle of a variable duty-cycle control signal 430 of the variable duty-cycle controller 406 that varies as a function of a load voltage (e.g., a battery voltage). For another example, the processor module 402 controls the variable duty-cycle controller 406. The processor module 402 may be implemented, or realized as explained above in the context of discussion of the processor module 102 of system 100.

The memory module 404 may be a data storage area with memory formatted to support the operation of the system 400. The memory module 404 is configured to store, maintain, and provide data as needed to support the functionality of the system 400 in the manner described below. For example the memory module 404 may store a frequency of the variable duty-cycle controller 406 that varies as a function of a voltage of the load 420.

In practical embodiments, the memory module 404 may be implemented, realized, or utilized as explained above in the context of discussion of the memory module 104 of the system 100. The memory module 404 may be coupled to the processor module 402 such that the processor module 402 can read information from and write information to the memory module 404. For example the processor module 402 may access the memory module 404 to monitor a frequency of the variable duty-cycle controller 406.

The voltage source 418 may comprise, for example but without limitation, a fuel cell, a battery, a generator, a satellite power source, a spacecraft power source, an aircraft power source, a shipboard generator, a train power source, a solar and engine powered long-duration aircraft, or spacecraft (manned and unmanned) power source, a super-heated thermal couple from a reactor, or other voltage source capable of sourcing or sinking current.

The voltage controlled current sources 424 may comprise, for example but without limitation, a solar panel, a solar array string, a fuel cell, a battery, a generator, a satellite power source, a spacecraft power source, an aircraft power source, a shipboard generator, a train power source, a solar and engine powered long-duration aircraft, or spacecraft (manned and unmanned) power source, a super-heated thermal couple from a reactor, or other voltage controlled current source.

The load 420 may comprise, for example but without limitation, a spacecraft, an electronic device, a motor, a heater, a power distribution system, an appliance, an additional electrical bus, or other load.

In an example embodiment, the second bus 416 comprises a spacecraft bus, the load 420 comprises space craft systems, the voltage source 418 comprises a battery charge controller combined with a bus regulator, and the voltage controlled current sources 424 comprises a solar panel system. When the solar panel system is used to power the spacecraft bus, the bi-directional converter 412 may be used to charge the battery. In this embodiment, the processor module 402 comprises a spacecraft regulator control system that can apply a negative voltage as the voltage control signal 434.

This results in current flowing from a bus such as the first electrical bus 414 to the voltage source 418 such as a battery that is proportional to the variable duty-cycle control signal 430 thus charging the battery. If the voltage controlled current sources 424 comprising the solar panel system coupled to the second bus 416 is unable to supply sufficient power to the second bus 416 to accommodate the spacecraft load, the processor module 402 comprises a spacecraft regulator control system applies a positive voltage to the voltage control signal 434 so that current flows out of the bi-directional converter 412 to supply the necessary current to regulate the second bus 416.

In another embodiment, the bi-directional converter 412 is used to convert about 100V bus power on a 100V bus to about 30V bus power on a 30V bus. One of the loads on the 30V bus is a reaction wheel which stores energy when it is spinning. If it is necessary to decelerate a rotational speed of the reaction wheel, electrical energy is returned to the 30V bus. If a current coming from the reaction wheel is higher than the load current, a 30V controller decreases the voltage applied to the voltage control signal 434 so that current will flow from the 30V bus to the 100V bus.

Thus, the voltage controlled current source bi-directional converter (bi-directional converter 412) is able to function as either a buck regulator to supply power from the 100V bus to the 30V bus or it may function as boost regulator to remove energy from the 30V bus and efficiently deliver it to the 100V bus where it can be used by equipment running from the 100V bus.

Figure 5:
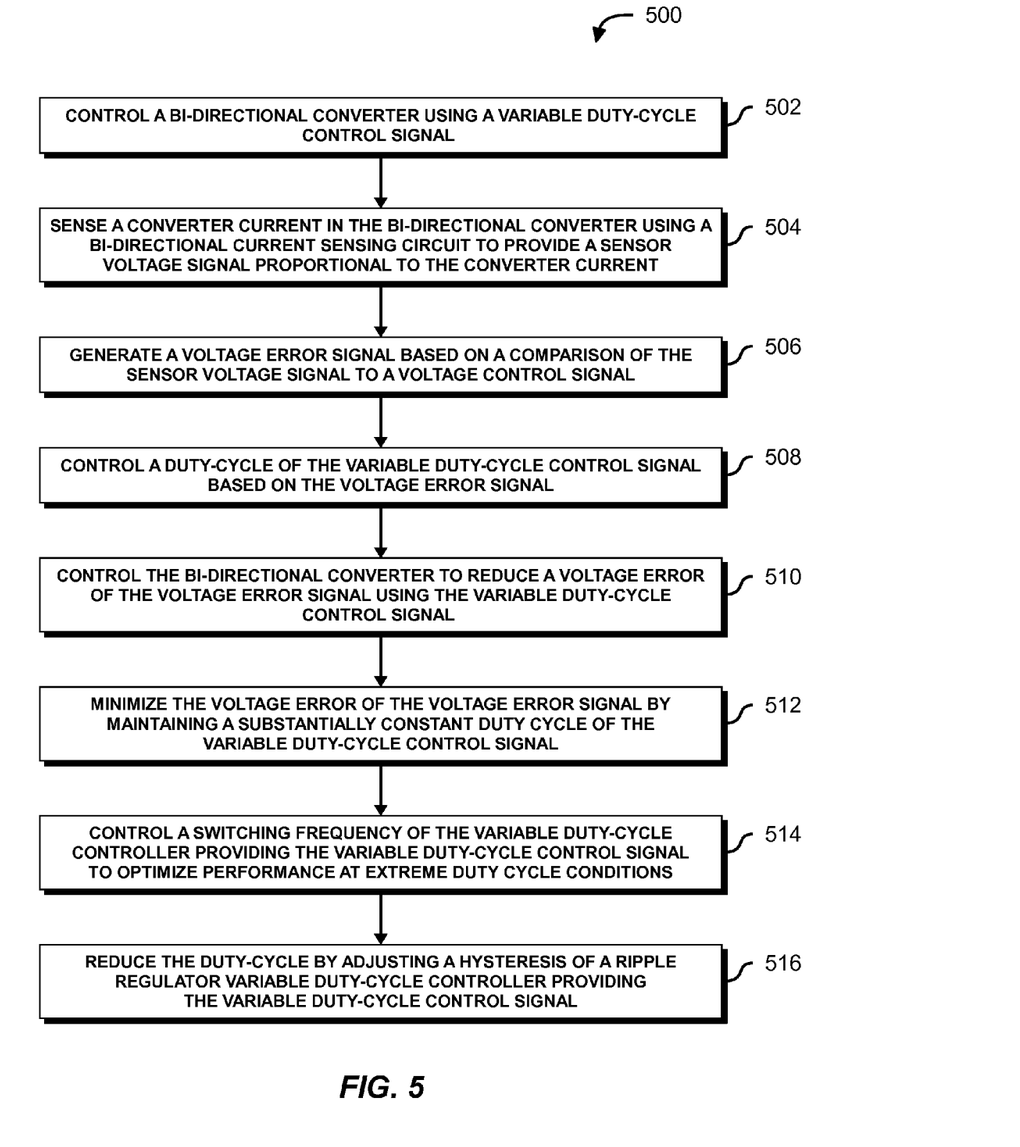
FIG. 5 is an illustration of an exemplary flowchart showing a voltage control process according to an embodiment of the disclosure.

FIG. 5 is an illustration of an exemplary flowchart showing a voltage control process 500 according to an embodiment of the disclosure. The various tasks performed in connection with process 500 may be performed mechanically, by software, hardware, firmware, or any combination thereof. It should be appreciated that process 500 may include any number of additional or alternative tasks, the tasks shown in FIG. 5 need not be performed in the illustrated order, and the process 500 may be incorporated into a more comprehensive procedure or process having additional functionality not described in detail herein.

For illustrative purposes, the following description of process 500 may refer to elements mentioned above in connection with FIG. 4. In practical embodiments, portions of the process 500 may be performed by different elements of the system 400 such as: the processor module 402, the memory module 404, the variable duty-cycle controller 406, the bi-directional current sensor 408, the bi-directional converter 412, the first electrical bus 414, a second electrical bus 416, the voltage source 418, the load 420, and the common ground 422, etc. The process 500 may have functions, material, and structures that are similar to the embodiments shown in FIG. 4. Therefore common features, functions, and elements may not be redundantly described here.

Process 500 may begin by controlling a bi-directional converter such as the bi-directional converter 412 using a variable duty-cycle control signal such as the variable duty-cycle control signal 430 (task 502).

Process 500 may continue by sensing a converter current such as the converter current 426 in the bi-directional converter 412 using a bi-directional current sensing circuit such as the bi-directional current sensor 408 to provide a sensor voltage signal such as the sensor voltage signal 432 proportional to the converter current 426 (task 504).

Process 500 may continue by generating a voltage error signal such as the voltage error signal 428 based on a comparison of the sensor voltage signal 432 to a voltage control signal such as the voltage control signal 434 (task 506).

Process 500 may continue by controlling a duty-cycle of the variable duty-cycle control signal 430 based on the voltage error signal 428 (task 508).

Process 500 may continue by controlling the bi-directional converter to reduce a voltage error of the voltage error signal 428 using the variable duty-cycle control signal 430 (task 510).

Process 500 may continue by minimizing the voltage error of the voltage error signal 428 by maintaining a substantially constant duty-cycle of the variable duty-cycle control signal 430 (task 512). The voltage error of the voltage error signal 428 may comprise a difference between the sensor voltage signal 432 (current sensor feedback signal) and the voltage control signal 434 (processor module control signal).

Process 500 may continue by controlling a switching frequency of the variable duty-cycle controller 406 providing the variable duty-cycle control signal 430 to optimize performance at substantially extreme duty cycle conditions (task 514). For example, the substantially extreme duty cycle conditions may comprise a duty cycle near either 0 or 1, where 0 is a 0% duty cycle and 1 is a 100% duty cycle.

Process 500 may continue by reducing the duty-cycle by controlling a hysteresis of a ripple regulator variable duty-cycle controller 406 providing the variable duty-cycle control signal 430 (task 516).

In this manner, using a bi-directional converter voltage controlled current source system stabilizes a control loop of the bi-directional converter allowing: current sharing of like modules; easy transition from a first type of regulator system (e.g., a solar panel regulator system) to a second type of regulator system (e.g., a battery charge/discharge control system); simplification of control loop stabilization since all converters provide a voltage controlled current to a capacitance of the electrical bus (e.g., a spacecraft load). Thus the bi-directional converter voltage controlled current source systems 100/400 create a highly versatile building block for power systems. Using the system 100/400 bi-directional converters can be combined to regulate power flow to/from multiple controlled sources.

Figure 6:
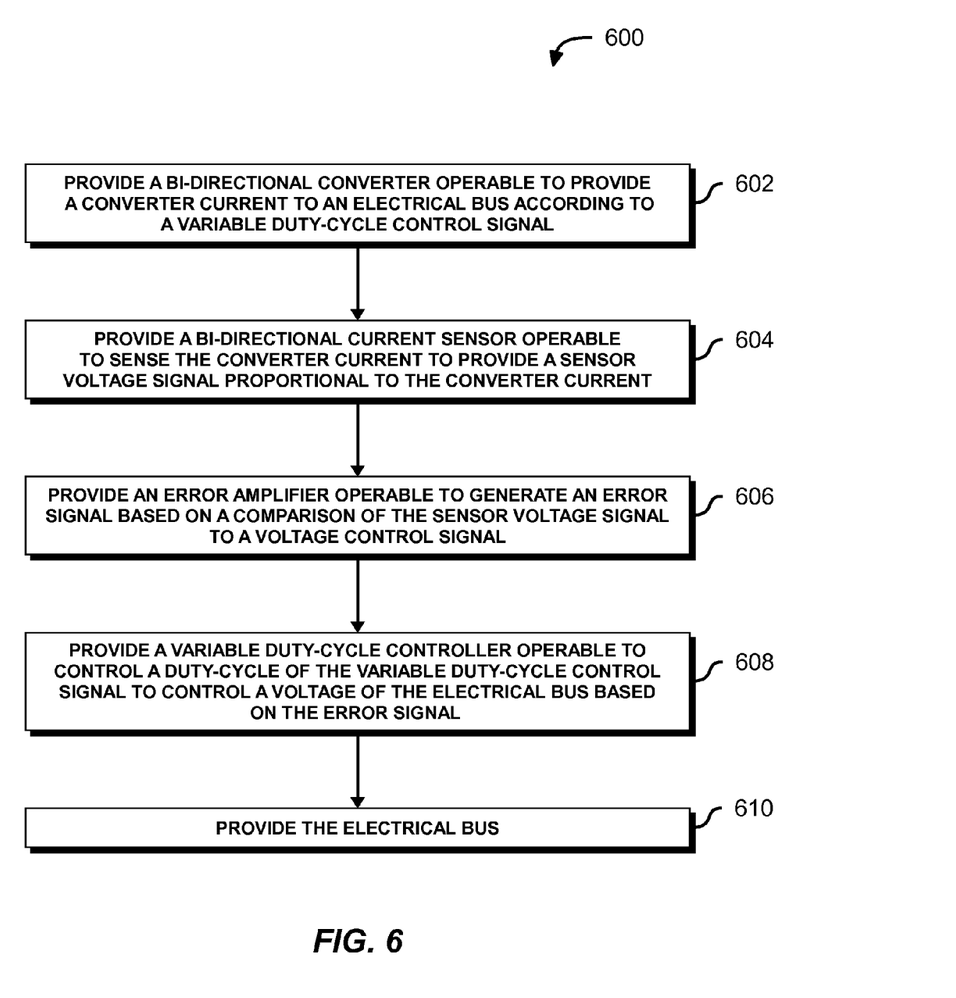
FIG. 6 is an illustration of an exemplary flowchart showing a process for providing a bi-directional converter voltage controlled current source according to an embodiment of the disclosure.

FIG. 6 is an illustration of an exemplary flowchart showing a process 600 for providing a bi-directional converter voltage controlled current source according to an embodiment of the disclosure. The various tasks performed in connection with process 600 may be performed mechanically, by software, hardware, firmware, or any combination thereof. It should be appreciated that process 600 may include any number of additional or alternative tasks, the tasks shown in FIG. 6 need not be performed in the illustrated order, and the process 600 may be incorporated into a more comprehensive procedure or process having additional functionality not described in detail herein.

For illustrative purposes, the following description of process 600 may refer to elements mentioned above in connection with FIG. 4. In practical embodiments, portions of the process 600 may be performed by different elements of the system 400 such as: the processor module 402, the memory module 404, the variable duty-cycle controller 406, the bi-directional current sensor 408, the bi-directional converter 412, the first electrical bus 414, a second electrical bus 416, the voltage source 418, the load 420, and the common ground 422, etc. The process 600 may have functions, material, and structures that are similar to the embodiments shown in FIG. 4. Therefore common features, functions, and elements may not be redundantly described here.

Process 600 may begin by providing a bi-directional converter such as the bi-directional converter 412 operable to provide a converter current such as the converter current 426 to an electrical bus such as the first electrical bus 414 or the second electrical bus 416 according to a variable duty-cycle control signal such as the variable duty-cycle control signal 430 (task 602).

Process 600 may continue by providing a bi-directional current sensing circuit such as the bi-directional current sensor 408 operable to sense the converter current 426 to provide a sensor voltage signal proportional to the converter current 426 (task 604).

Process 600 may continue by providing an error amplifier such as the error amplifier 410 operable to generate a error signal such as the error signal 428 based on a comparison of the sensor voltage signal to a voltage control signal such as the voltage control signal 434 (task 606).

Process 600 may continue by providing a variable duty-cycle controller such as the variable duty-cycle controller 406 operable to control a duty-cycle of the variable duty-cycle control signal 430 to control a voltage on the electrical bus 414/416 based on the error signal 428 (task 608).

Process 600 may continue by providing the electrical bus 414/416 (task 610).

In this way, embodiments of the disclosure provide a control method for combining bi-directional converters to regulate power flow to/from multiple controlled sources.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1 and 4 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or"

should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A bi-directional converter voltage controlled current system comprising:
   one or more voltage controlled current sources;
   a bi-directional converter operable to provide a bi-directional current to an electrical bus according to a variable duty-cycle control signal;
   a bi-directional current sensor operable to sense the bi-directional current to provide a sensor voltage signal proportional to the bi-directional current;
   an error amplifier operable to generate an error signal based on a comparison of the sensor voltage signal to a voltage control signal;
   a variable duty-cycle controller operable to generate the variable duty-cycle control signal to control a voltage of the electrical bus based on the error signal; and
   a processor module coupled to the error amplifier and operable to generate the voltage control signal by at least:
      generating a positive voltage control signal as the voltage control signal when the one or more voltage controlled current sources are unable to supply sufficient power to a particular load, and
      generating a negative voltage control signal as the voltage control signal when the one or more voltage controlled current sources supply sufficient power to the particular load.

2. The bi-directional converter voltage controlled current system according to claim 1, wherein the one or more voltage controlled current sources are coupled to the electrical bus and the processor module.

3. The bi-directional converter voltage controlled current system according to claim 2, wherein:
   the error signal comprises a difference between the sensor voltage signal and the voltage control signal.

4. The bi-directional converter voltage controlled current system according to claim 1, wherein the bi-directional current is proportional to the error signal.

5. The bi-directional converter voltage controlled current system according to claim 1, wherein the bi-directional current is proportional to the variable duty-cycle control signal.

6. The bi-directional converter voltage controlled current system according to claim 1, further comprising the electrical bus.

7. The bi-directional converter voltage controlled current system according to claim 1, wherein the electrical bus is coupled to a voltage source.

8. The bi-directional converter voltage controlled current system according to claim 1, wherein the electrical bus is coupled to a load.

9. The bi-directional converter voltage controlled current system according to claim 1, wherein the variable duty-cycle controller comprises a ripple regulation controller operable to adjust a feedback loop to force the bi-directional current to be substantially proportional to a control signal.

10. The bi-directional converter voltage controlled current system according to claim 9, wherein the ripple regulation controller is further operable to stabilize a switching frequency of the variable duty-cycle control signal controlling the bi-directional current.

11. The bi-directional converter voltage controlled current system according to claim 10, wherein the switching frequency may be reduced at substantially extreme duty cycle conditions to achieve duty cycles near one of: 0% and 100%.

12. The bi-directional converter voltage controlled current system according to claim 10, wherein the variable duty-cycle controller comprises at least one of: a proportional-integral (PI) controller, a proportional-integral-derivative (PID) controller, and a feedback controller.

13. The bi-directional converter voltage controlled current system according to claim 1, wherein the error signal varies between a negative voltage and a positive voltage.

14. The bi-directional converter voltage controlled current system according to claim 1, wherein:
   the error signal comprises a difference between the sensor voltage signal and the voltage control signal.

15. A voltage control method for a bi-directional converter voltage controlled current system, the method comprising:
   controlling a bi-directional converter coupled to an electrical bus using a variable duty-cycle control signal;
   sensing a bi-directional current in the bi-directional converter using a bi-directional current sensor to provide a sensor voltage signal proportional to the bi-directional current;
   generating an error signal based on a comparison of the sensor voltage signal to a voltage control signal using an error amplifier that is coupled to the bi-directional current sensor;
   generating the variable duty-cycle control signal to control a voltage of the electrical bus based on the error signal; and
   generating the voltage control signal using a processor module that is coupled to the error amplifier by at least:
      generating a positive voltage control signal as the voltage control signal when one or more voltage controlled current sources are unable to supply sufficient power to a particular load, and
      generating a negative voltage control signal as the voltage control signal when the one or more voltage controlled current sources supply sufficient power to the particular load.

16. The method according to claim 15, further comprising controlling the bi-directional converter to reduce the error signal.

17. The method according to claim 15, further comprising controlling a switching frequency of the variable duty-cycle controller generating the variable duty-cycle control signal to optimize performance at substantially extreme duty cycle conditions.

18. The method according to claim 15, further comprising reducing the duty-cycle by controlling a hysteresis of a ripple regulator variable duty-cycle controller generating the variable duty-cycle control signal.

19. A method for providing a bi-directional converter voltage controlled current source, the method comprising:
providing a bi-directional converter operable to provide a bi-directional current to an electrical bus according to a variable duty-cycle control signal;
providing a bi-directional current sensor operable to sense the bi-directional current to provide a sensor voltage signal proportional to the bi-directional current;
providing an error amplifier operable to generate an error signal based on a comparison of the sensor voltage signal to a voltage control signal, wherein the error amplifier is coupled to the bi-directional current sensor;
providing a variable duty-cycle controller operable to generate the variable duty-cycle control signal to control a voltage of the electrical bus based on the error signal; and
providing a processor module operable to generate the voltage control signal, wherein the processor module is coupled to the error amplifier, wherein the processor module is for:
generating a positive voltage control signal as the voltage control signal when one or more voltage controlled current sources are unable to supply sufficient power to a particular load, and
generating a negative voltage control signal as the voltage control signal when the one or more voltage controlled current sources supply sufficient power to the particular load.

20. The method according to claim 19, wherein the bi-directional current is proportional to a control signal.

* * * * *